United States Patent [19]
Chatterjee et al.

[11] 3,889,678
[45] June 17, 1975

[54] CELLULOSE GRAFT COPOLYMER CONTAINING NON-IONIC AND IONIC POLYMER MOIETIES AS ABSORBENT MEDIA IN ABSORBENT DRESSINGS

[75] Inventors: Pronoy Kumar Chatterjee, Spotswood; Robert Frederick Schwenker, Jr., Belle Mead, both of N.J.

[73] Assignee: Personal Products Company, Milltown, N.J.

[22] Filed: Dec. 7, 1973

[21] Appl. No.: 422,627

[52] U.S. Cl. .............. 128/284; 128/285; 128/290; 128/296; 260/17.4 GC; 260/17.4 R; 260/17.4 CL
[51] Int. Cl. ............................................ A61f 13/16
[58] Field of Search................260/17.4 GC, 17.4 R, 17.4 CL; 128/296, 290, 285, 284

[56] References Cited
UNITED STATES PATENTS

| | | | |
|---|---|---|---|
| 3,024,207 | 3/1962 | Shaw et al. | 128/285 |
| 3,094,494 | 6/1963 | Hopkins et al. | 128/285 |
| 3,194,727 | 7/1965 | Adams et al. | 260/17.4 GC |
| 3,241,553 | 3/1966 | Steiger | 128/296 |
| 3,457,198 | 7/1969 | Sobolev | 260/17.4 GC |
| 3,607,799 | 9/1971 | Barbehenn et al. | 260/17.4 GC |
| 3,699,965 | 10/1972 | Dostal | 128/285 |
| 3,801,675 | 4/1974 | Russell | 128/296 |

FOREIGN PATENTS OR APPLICATIONS

| | | | |
|---|---|---|---|
| 226,793 | 1/1969 | U.S.S.R. | 128/296 |

*Primary Examiner*—Morris Liebman
*Assistant Examiner*—Edward Woodberry
*Attorney, Agent, or Firm*—Jason Lipow

[57] ABSTRACT

A backbone of natural or regenerated cellulose in fibrous form which has side chains of polymer moieties grafted thereto (cellulose graft copolymer) provides a novel, highly water-absorbent, soft, non-flammable, fibrous material useful for a variety of water or aqueous fluid-absorbent products particularly body fluid absorbent dressings such as diapers, sanitary napkins, tampons, surgical sponges, and the like. The polymer side chains are made up of ionic and non-ionic polymer moieties and, on a weight basis, may amount to from about 10% to about 90% of the cellulose graft copolymer. The ionic polymer moieties comprise from about 10% to about 80% by weight of the cellulose graft copolymer, and the non-ionic polymer moieties comprise from about 0.5% to about 60% by weight of the cellulose graft copolymer.

12 Claims, No Drawings

CELLULOSE GRAFT COPOLYMER CONTAINING NON-IONIC AND IONIC POLYMER MOIETIES AS ABSORBENT MEDIA IN ABSORBENT DRESSINGS

BACKGROUND OF THE INVENTION

Cellulose fiber is a raw material for many commercial absorbent products. Because of the constant demand for improvement in the absorbency of these products, there has been a concomitant demand for improvement in the absorbency of natural and regenerated cellulose fiber. Because cellulose is a naturally occurring polymer and is not synthesized by man, its structure is not susceptible to alternation by copolymerization methods used in the manufacture of synthetic polymers. However, absorbency of cellulose fibers has been improved by modification of its chemical structure, the known techniques being: (1) by substituting new chemical groups at the site of the original hydroxyl groups of the cellulose fibers; (2) by crosslinking cellulose chains into a network structure; (3) by introducing new groups and crosslinking them together; or (4) by grafting polymer side chains onto the cellulose backbone.

These chemical modifications are generally carried out in liquid (preferably aqueous) slurries and the resulting modified fibers are then dried into pulpboard which is subsequently ground into pulp fluff. While such prior methods have, in the main, produced more absorbent cellulosic fibers, the fibers are generally highly brittle and so easily lose their fibrous structure and reduce to extremely short fibers or powders upon mild mechanical treatment, as for example, when the pulpboard is ground into pulp fluff. Additionally, it has been discovered that these prior products tend to have a high degree of bonding between the fibers and so tend to form agglomerates of hard knot-like material similar to solid resin when dried into pulpboard from water slurries, a process known as hornification. These knots are not fibrous and so when the pulpboard is ground to fluff the knots either breakdown into powder or remain whole and, in either form, are unuseable in absorbent dressings. Thus, while modified cellulose fibers of the prior art have greater absorbency than unmodified cellulose fibers, they gain this absorbency at the cost of decreased softness and loss of other desirable fibrous qualities.

By the present invention a cellulose fiber (natural or regenerated) of modified chemical structure is provided which has significantly greater absorbency than an unmodified cellulose fiber, while retaining the fibrous quality thereof and avoiding the problems found in the modified cellulose fibers of the prior art.

SUMMARY OF THE INVENTION

The invention relates to a cellulose graft copolymer in fibrous form and to the method for making the same.

According to the present invention, there is provided a cellulose graft copolymer having a backbone of natural or regenerated cellulose in fibrous form, which backbone has side chains of polymer moieties grafted thereto. This cellulose graft copolymer is a highly water-absorbent, soft, non-flammable, fibrous material useful for a variety of water or aqueous fluid absorbent products, such as absorbent dressings in general and, in particular, diapers, sanitary napkins, tampons, surgical sponges, and the like.

The copolymer side chains on the cellulose backbone are made up of ionic and non-ionic polymer moieties. On a weight basis, these copolymer side chains may amount to from about 10% to about 90% of the cellulose graft copolymer, but preferably from about 50% to about 85% of the cellulose graft copolymer. These copolymer side chains are ideally made up of alternating ionic and non-ionic polymer moieties, but they may be made up of alternating groups of ionic and non-ionic polymer moieties. A particular side chain may even be made up completely of one type of moiety or the other, so long as the overall proportions of ionic and non-ionic moieties (discussed below) are maintained.

The ionic polymer moieties may be any ionic polymer moiety as, for example, poly(acrylic acid), sodium poly(acrylate), poly(methacrylic acid), potassium poly(methacrylate), poly(vinyl alcohol sulfate), poly(phosphoric acid), poly(vinyl amine), poly(4-vinyl pyridine), hydrolyzed poly(acrylonitrile) and the like. They comprise from about 10% to about 80% by weight of the cellulose graft copolymer, but preferably from about 20% to about 70% by weight of the cellulose graft copolymer.

The non-ionic polymer moieties may be any non-ionic polymer moiety, as, for example, poly(methyl methacrylate), poly(ethyl methacrylate), poly(ethyl acrylate), poly(butyl acrylate), poly(vinyl acetate), poly(styrene), poly(butadiene), poly(isoprene), and the like. They comprise from about 0.5% to about 60% by weight of the cellulose graft copolymer, but preferably from about 10% to about 60% by weight of the cellulose graft copolymer.

The cellulosic fiber used in making the cellulose graft copolymer fiber of the invention may be natural cellulose fiber as, for example, wood pulp, hemp, bagasse, cotton, and the like, or a regenerated cellulose fiber as, for example, rayon. It is also contemplated that various modified cellulose fibers such as, ethers and esters of cellulose may also be used provided that such modifications are not inconsistent with the teachings of this invention.

The cellulose graft copolymer fiber is preferably prepared according to the method of the invention by the copolymerization of (a) fibrous cellulose; (b) a copolymerizable monomer which is also hydrolyzable after copolymerization to form an ionic polymer moiety; and (c) a copolymerizable, non-ionic, at least particularly non-hydrolyzable monomer. The resulting unhydrolyzed cellulose graft copolymer is reacted with an excess of a solution of a strong base to effect hydrolysis of the hydrolyzable portion of the grafted polymer moieties and convert them to ionic form such as the salts of the strong base, while leaving the non-ionic, non-hydrolyzable portion of the grafted polymer moieties unchanged.

It should be understood that it is within the scope of the invention to graft either preformed copolymers or preformed homopolymers to a fibrous cellulose backbone to prepare the desired cellulose graft copolymer but the in situ formation described above is preferred. It is further within the scope of the invention to polymerize a mixture of a cellulose and the two monomers in a single reaction mixture (which is preferred) or to carry out the polymerization in steps by adding first one monomer and then the other.

DETAILED DESCRIPTION OF THE INVENTION

The cellulose graft copolymer of the invention is preferably prepared by the copolymerization of (a) fibrous cellulose; (b) a copolymerizable monomer which is hydrolyzable after copolymerization to form an ionic polymer moiety; and (c) a copolymerizable, non-ionic, at least partially non-hydrolyzable monomer. The reactants may be dispersed and the reaction carried out in a vapor medium or a non-aqueous medium such as, for example, acetone, alcohols (e.g., methanol, ethanol, isopropanol, etc.) benzene, liquid ammonia and the like. Preferably, however, the reaction is carried out in an aqueous medium.

When in a liquid medium, to promote dispersion and hence more uniform copolymerization of some monomers (e.g., butadiene), it is desirable to add a few drops of an emulsifier to the reaction mixture. Examples of such an emulsifier are Triton X-100 (one of a class of acrylalkyl polyether alcohols, sulfonates, and sulfates sold by Rohm and Haas); sodium lauryl sulfate; lauryl trimethyl ammonium chloride; a cationic quaternary ammonium salt of the alkyl trimethylammonium chloride and dialkyl dimethylammonium chloride types wherein the average alkyl composition is 90% dodecyl, 9% tetradecyl, and 19% octadecyl and which is supplied as a solution of 33% active ingredient, 17% sodium chloride, and 50% water by Armour and Company as Arquad 12; lauryl pyridinium chloride; and the like.

The copolymerization reaction may be initiated with an ionic initiator (e.g., alkali hydroxides), a cationic initiator (e.g., a Lewis acid such as boron trifluoride), or even radiation (ultraviolet, gamma, or X-radiation). It is preferred, however, that the polymerization be carried out by the free-radical copolymerization mechanism using a free-radical initiator such as, for example, ceric ion, ferrous ion, cobaltic ion, $(NH_4)_2S_2O_8$ cuprous ion, and the like. The ceric ion initiator is preferred.

Because most free-radical reactions are inhibited by the presence of oxygen, it is desirable to flush out essentially all the oxygen from the reaction mixture and reaction vessels by bubbling a non-oxidizing gas, such as nitrogen, helium, argon, etc., through the system prior to the addition of the free-radical initiator.

The pH range used for the reaction depends on the particular initiator used. One could use anywhere from a highly acidic pH (pH 0.8–2.3) to a highly basic pH (pH 12–14), depending on the particular initiator. For the preferred ceric ion initiator, the pH should be acidic, i.e., less than seven and preferably about 0.8 to about 2.3.

The temperature of the copolymerization reaction may be anywhere from room temperature (i.e., 20° to 30°C.) to the normal boiling point of the lowest boiling component of the mixture. If the reaction is carried out under greater than atmospheric pressure, the temperature could then be raised above the boiling point of the lowest boiling component of the mixture. The reaction mixture may also be cooled below room temperature, if desired.

The hydrolyzable polymer moieties of the resulting cellulose graft copolymer fibers are hydrolyzed by reacting the fibers, preferably under reflux, with an excess of a solution of a strong base, e.g., sodium hydroxide, potassium hydroxide, lithium hydroxide, and like bases. The concentration of this solution may be from about 1% to about 50% by weight and the temperature of hydrolysis may be from room temperature to reflux.

One preferred procedure for forming the cellulose graft copolymer fibers of this invention is as follows. A ceric ammonium nitrate initiator solution is prepared by dissolving ten millimoles of the ceric salt per 100 ml of 1N nitric acid, as described by E. Schwab, et al, TAPPI, 45, 390 (1962). Wood pulp is then dispersed in water and dry nitrogen is bubbled through the dispersion with stirring. A small amount of the initiator solution is then added to the stirred dispersion with continued bubbling of nitrogen gas, and then a mixture of hydrolyzable and non-hydrolyzable monomers as described above is added. The total weight of monomer added is usually at least four times the weight of wood pulp present. After the reaction has been allowed to continue for the desired period of time (generally from about 1 to about 4 hours), the resulting cellulose graft copolymer fibers are washed, hydrolyzed as described above, washed again and dried.

The preferred ionic polymer moiety is sodium poly(acrylate), and the preferred non-ionic polymer moieties are poly(methyl methacrylate), poly(ethyl acrylate), and poly(butadiene). It was discovered in early experimentation that the use of acrylic acid as a starting hydrolyzable monomer for introduction of the preferred ionic polymer moiety led to considerable homopolymerization of the hydrolyzable monomer rather than graft copolymerization of both hydrolyzable and non-hydrolyzable monomers to the cellulose backbone. Therefore, other hydrolyzable acrylic monomers were tested, leading to the use of acrylonitrile as the starting hydrolyzable monomer for the introduction of the preferred ionic polymer moiety. The non-hydrolyzable monomers used are, of course, just the monomer forms of the desired non-ionic polymer moieties; viz.: methyl methacrylate, ethyl acrylate, and butadiene. After the copolymerization reaction is complete, hydrolysis of the poly(acrylonitrile) moieties as described above yields ionic "alkali metal poly(acrylate)" moieties.

The cellulose graft copolymer fibers of the invention have significantly greater absorbency (from about four to about nine times greater) than unmodified wood pulp, while still retaining a fibrous form. In addition, the cellulose graft copolymer fibers of the invention are not subject to the brittleness and hornification as are prior art modified cellulose fibers.

A further unexpected useful quality of the hydrolyzed cellulose graft copolymer fibers of the present invention is that they are non-flammable, while unmodified cellulose fibers are highly flammable. The absorbent materials made from the fibers of the present invention may thus advantageously be used where stringent precautions must be taken against fire; e.g., in hospitals, nursing homes, etc.

The cellulose graft copolymer fibers of the invention may be used alone or mixed with unmodified cellulose fibers or other absorbent material in the manufacture of absorbent napkins, tampons, sponges, and the like. The fibers of the invention may also be made into non-woven fabrics, which fabrics are useful in the manufacture of absorbent napkins, tampons, sponges and the like.

The cellulose graft copolymer of the invention and its method of preparation will be more fully understood from a consideration of the following examples, which are given for the purpose of illustration and are not to be construed as limiting the invention in spirit or in scope except as set forth in the appended claims.

EXAMPLE I

Ceric ammonium nitrate initiator solution is prepared by dissolving the ceric salt in 1N nitric acid to a concentration of 10 millimoles/100 ml. Into a three-necked flask fitted with a stirrer, a gas bubbling tube, and a stopper funnel are placed 500 ml. of water and

EXAMPLE II

The procedure of Example I is repeated, except that varying amounts of methyl methacrylate and acrylonitrile are used. The amounts of methyl methacrylate and acrylonitrile used, together with the compositions of the resulting products, are shown in Table I.

TABLE I

Chemical Characterization of Cell. - Na Poly(acrylate-methyl methacrylate) Copolymers

| Grafted Sample Numbers | Reactants Parts by Weight | | | Product Composition (%) | | | | | | | | Molecular Ratio Hydrolyzed | | |
|---|---|---|---|---|---|---|---|---|---|---|---|---|---|---|
| | | | | Unhydrolyzed | | | | Hydrolyzed | | | | | | |
| | Cell. | MMA | AN | Cell. | Total Polymer | MMA | AN | Cell. | Total Polymer | MMA | Na-Acry. | Glucose Unit | MMA | Na-Acry. |
| 1 | 1 | 4.7 | 0 | 41.5 | 58.5 | 58.1 | 0 | 41.7 | 58.3 | 58.3 | 0 | 1 | 2.2 | 0 |
| 2 | 1 | 2.3 | 2.1 | 41.9 | 58.1 | 45.9 | 12.2 | 38.3 | 61.7 | 42.0 | 19.7 | 1 | 1.8 | 0.9 |
| 3 | 1 | 1.9 | 2.4 | 42.6 | 57.4 | 41.5 | 15.9 | 37.9 | 62.1 | 37.0 | 25.1 | 1 | 1.6 | 1.2 |
| 4 | 1 | 1.5 | 2.7 | 45.3 | 54.7 | 29.3 | 25.4 | 37.9 | 62.1 | 24.5 | 37.6 | 1 | 1.0 | 1.7 |
| 5 | 1 | 1.1 | 3.0 | 45.8 | 54.2 | 26.9 | 27.3 | 37.8 | 62.2 | 22.2 | 39.9 | 1 | 1.0 | 1.9 |
| 6 | 1 | 0.7 | 3.3 | 43.4 | 56.6 | 27.3 | 29.3 | 35.4 | 64.6 | 22.3 | 42.3 | 1 | 1.0 | 2.0 |
| 7 | 1 | 0.6 | 3.5 | 46.4 | 53.6 | 6.7 | 46.9 | 34.1 | 65.9 | 4.9 | 61.0 | 1 | 0.2 | 3.0 |
| 8 | 1 | 0.5 | 3.6 | 44.4 | 55.6 | 1.4 | 54.2 | 31.3 | 68.7 | 0.99 | 67.7 | 1 | 0.1 | 3.8 |
| 9 | 1 | 0.4 | 3.7 | 45.5 | 54.5 | 0 | 55.5 | 31.6 | 68.4 | 0 | 68.4 | 1 | 0 | 3.6 |
| 10 | 1 | 0 | 4.0 | 45.8 | 54.2 | 0 | 54.2 | 31.7 | 66.3 | 0 | 66.3 | 1 | 0 | 3.6 |

Cell. = Cellulose moiety; MMA = Poly(methyl methacrylate) moiety; AN = Poly(Acrylonitrile) moiety; Na-Acry. = Sodium Poly(acrylate) moiety.

TABLE II

Chemical Characterization of Cell. - Na Poly(acrylate-ethylacrylate) Copolymers

| Grafted Sample Numbers | Reactants Parts by Weight | | | Product Composition (%) | | | | | | | | Molecular Ratio Hydrolyzed | | |
|---|---|---|---|---|---|---|---|---|---|---|---|---|---|---|
| | | | | Unhydrolyzed | | | | Hydrolyzed | | | | | | |
| | Cell. | EA | AN | Cell. | Total Polymer | EA | AN | Cell. | Total Polymer | EA | Na-Acry. | Glucose Unit | EA | Na-Acry. |
| 1 | 1 | 4.5 | 0 | 20.7 | 79.3 | 79.3 | 0 | 20.7 | 79.3 | 79.3 | 0 | 1 | 6.1 | 0 |
| 2 | 1 | 3.6 | 0.8 | 22.4 | 77.5 | 63.5 | 14.1 | 20.2 | 79.8 | 57.3 | 22.5 | 1 | 4.6 | 2.0 |
| 3 | 1 | 2.9 | 1.4 | 23.4 | 76.6 | 56.7 | 19.9 | 20.3 | 79.7 | 49.2 | 30.5 | 1 | 4.1 | 2.7 |
| 4 | 1 | 2.3 | 2.0 | 24.8 | 75.2 | 42.5 | 32.7 | 19.8 | 80.2 | 33.9 | 46.3 | 1 | 2.9 | 4.1 |
| 5 | 1 | 1.6 | 2.5 | 28.9 | 71.1 | 34.9 | 36.2 | 22.6 | 77.4 | 27.3 | 50.1 | 1 | 2.0 | 3.8 |
| 6 | 1 | 1.1 | 3.0 | 32.0 | 68.0 | 25.6 | 42.4 | 24.1 | 75.9 | 19.3 | 56.6 | 1 | 1.3 | 4.0 |
| 7 | 1 | 0.7 | 3.4 | 43.5 | 56.5 | 16.3 | 40.2 | 33.2 | 66.8 | 12.4 | 54.3 | 1 | 0.6 | 2.8 |
| 8 | 1 | 0 | 4.0 | 48.1 | 51.9 | 0 | 51.9 | 34.4 | 65.6 | 0 | 65.6 | 1 | 0 | 3.3 |

Cell. = Cellulose; AN = Poly(acrylonitrile) moiety; EA = Poly(ethylacrylate) moiety; Na-Acry. = Sodium Poly(acrylate) moiety.

5 g of wood pulp. The wood pulp is dispersed in the water by stirring and dry nitrogen is bubbled through the dispersion for 15 minutes with continuous stirring. To the stirred dispersion is added 12.5 ml of the ceric ammonium nitrate initiator solution with continued nitrogen bubbling. A mixture of 5.5 g of methyl methacrylate and 15.0 g of acrylonitrile is added to the stirred dispersion, and the whole is allowed to react for 1 hour at room temperature. At the end of 1 hour, the resulting unhydrolyzed cellulose graft copolymer fibers are transferred to a Buchner funnel and are washed thoroughly with water and acetone. The washed fibers are then refluxed with an excess of 6% sodium hydroxide solution for one-half hour to hydrolyze the hydrolyzable polymer moieties. The resulting hydrolyzed cellulose graft copolymer fibers are washed thoroughly with water, pressed to remove excess water and dried in an oven at 100°C. to form a pulpboard. The composition of the resulting product is given in Table I (sample No. 5).

EXAMPLE III

The process of Example II is repeated, except that ethyl acrylate is substituted for the methyl methacrylate used therein. The amounts of ethyl acrylate and acrylonitrile used and the compositions of the resulting products are given in Table II.

EXAMPLE IV

The pulpboard products of Examples I, II and III are shredded into pulp fluff and then formed into absorbent pads. For comparative purposes, a pad consisting of unmodified wood pulp is also prepared. The pads are tested for fluid retention using a Porous Plate Testing Apparatus, as described in detail in Textile Res. J., 37, pp. 356–366, 1967. Briefly, this test involves placing the sample pad in what is essentially a Buchner funnel having a porous bottom plate and holding the sample in place by applying thereon a standard weight to maintain a standardized confining pressure. The porous plate is placed in contact with a reservoir of fluid and the sample is allowed to absorb fluid through the porous plate until saturated. By maintaining the sample at essentially the level of the reservoir, the fluid absorbed is subjected to essentially a zero hydraulic head with respect to the reservoir. To determine fluid retention, the saturated sample is elevated with respect to the fluid reservoir, thereby imposing a hydraulic head upon the fluid absorbed, the head being arbitrarily chosen as 36 inches of fluid. The apparatus is provided with means for directly measuring the volume of fluid retained under this hydraulic head. Retention values are reported as the volume retained per unit weight of absorbent fiber. The resulting values are reported in Table III and IV under the heading, Uncompressed Retention Values. The fluid used in these experiments is a 1% by weight, aqueous, sodium chloride solution which closely approximates the absorbent characteristics of menstrual fluid.

ylene sleeve. Excess fluid is drained from the tampon, the pressure is released and the weight of water absorbed by the tampon is determined and reported in Tables III and IV as the tampon capacity in units of volume of fluid absorbed per unit weight of tampon.

Referring to Tables III and IV, it can be seen that the grafted cellulose sample (1) containing only the nonionic polymer moiety methyl methacrylate (MMA in Table III and EA in Table IV) exhibits an absorption capacity which differs only moderately when compared to the wood pulp sample. It should be noted in this connection that while MMA and EA grafted moieties are generally non-ionic and hence hydrophobic, they have been subjected to a hydrolysis step and accordingly, the surface characteristics of the grafted fibers have been affected, particularly that of the EA grafted fibers which explains the variation in absorption properties with respect to wood pulp.

TABLE III

Physical Characterization of Cell. - Na Poly(acrylate-methyl methacrylate) Copolymer

| Grafted Sample Numbers | Product Composition (%) | | | Absorbency (cc/g) | |
|---|---|---|---|---|---|
| | Cell. | MMA | Na-Acry. | Fluid Retention | Tampon Capacity (50% blend with wood pulp) |
| Wood Pulp | 100 | — | — | 1.5 | 2.6 |
| 1 | 41.7 | 58.3 | 0 | 0 | 3.08 |
| 2 | 38.3 | 42.0 | 19.7 | 0.8 | 3.49 |
| 3 | 37.9 | 37.0 | 25.1 | 1.5 | 3.81 |
| 4 | 37.9 | 24.5 | 37.6 | 5.3 | 5.01 |
| 5 | 37.8 | 22.2 | 39.9 | 7.0 | 5.37 |
| 6 | 35.4 | 22.3 | 42.3 | 6.9 | 5.27 |
| 7 | 34.1 | 4.9 | 61.0 | 5.4 | 4.96 |
| 8 | 31.3 | 1.0 | 67.7 | 4.2 | 4.40 |
| 9 | 31.6 | 0 | 68.4 | gelled | — |
| 10 | 31.7 | 0 | 66.3 | gelled | — |

TABLE IV

Physical Characterization of Cell. - Na Poly(acrylate-ethylacrylate) Copolymer

| Grafted Sample Numbers | Product Composition (%) | | | Absorbency (cc/g) | |
|---|---|---|---|---|---|
| | Cell. | EA | Na-Acry. | Fluid Retention | Tampon Capacity (50% blend with wood pulp) |
| Wood Pulp | 100 | — | — | 1.5 | 2.7 |
| 1 | 20.7 | 79.3 | 0 | 2.9 | 3.45 |
| 2 | 20.2 | 57.3 | 22.5 | 12.0 | 6.27 |
| 3 | 20.3 | 49.2 | 30.5 | 14.0 | 6.54 |
| 4 | 19.8 | 33.9 | 46.3 | 9.5 | — |
| 5 | 22.6 | 27.3 | 50.1 | 9.3 | 5.29 |
| 6 | 24.1 | 19.3 | 56.6 | 9.5 | 5.81 |
| 7 | 33.2 | 12.4 | 54.3 | 10.8 | 5.92 |
| 8 | 34.4 | 0 | 65.6 | gelled | — |

EXAMPLE V

The materials of Examples I, II and III are shredded into pulp fluff and combined with an equal quantity of unmodified wood pulp fluff. The fluff mixture is formed into compressed cylindrical tampons having a density of 0.4 gm/cc, a diameter of about 0.57 inches and an axial length of about 1.68 inches. The capacity of these tampons to absorb a 1% by weight aqueous sodium chloride solution under simulated in-use conditions is determined by allowing one end of the tampon to be submerged in the solution for a period of 20 minutes while maintaining the sides of the tampon under a confining pressure of 24 inches of water maintained by enveloping the tampon in a hydraulically inflated polyethylene sleeve.

At the other extreme, the samples which have been grafted with only an ionic polymer (Na-Acry in Tables III & IV) are reported as gelled, i.e., gell formation has occurred in the outside of the absorbent sample tested and has precluded further absorption of the fluid into the central portions of the sample. In marked contrast to these extremes, it can be seen that samples having, in accordance with this invention, a combination of ionic and non-ionic polymer moieties grafted to the cellulose backbone, exhibit a dramatic increase in their absorptive properties, both with respect to the retention of fluid in uncompressed absorbent pads and the absorbent capacity of compressed fibrous bodies such as tampons. It is also apparent that within the preferred ranges of ionic and non-ionic polymer moiety compositions, absorption properties are maximized.

these fiber lengths is calculated and these results are reported in Tables V and VI.

TABLE V

Characterization of Hornification of Grafted Fibers
1. Cell - Na Poly(acrylate-methyl methacrylate)

| Grafted Sample Numbers | Product Composition (%) | | | Dry Fiber (Ground on Weber Mill) | | |
|---|---|---|---|---|---|---|
| | Cell. | MMA | Na-Acry. | Physical Form | Estimated Knot Content | Estimated Arith. Av. Fiber Length of Individual Fibers (mm) |
| Wood Pulp | 100 | — | — | Fibrous | 0–10 | 1.3 |
| 1 | 41.7 | 58.3 | 0 | Fibrous | 0–10 | 1.2 |
| 2 | 38.3 | 42.0 | 19.7 | Fibrous | 0–10 | 1.4 |
| 3 | 37.9 | 37.0 | 25.1 | Fibrous | 0–10 | 0.8 |
| 4 | 37.9 | 24.5 | 37.6 | Fibrous | 0–10 | 0.9 |
| 5 | 37.8 | 22.2 | 39.9 | Fibrous | 0–10 | 1.0 |
| 6 | 35.4 | 22.3 | 42.3 | Fibrous | 0–10 | 1.0 |
| 7 | 34.1 | 4.9 | 61.0 | Fibrous | 0–10 | 1.2 |
| 8 | 31.3 | 1.0 | 67.7 | Fibrous (bonded) | 73 | 1.1 |
| 9 | 31.6 | 0 | 68.4 | Highly Bonded Fibers | 81 | 0.7 |
| 10 | 31.7 | 0 | 66.3 | Highly Bonded Fibers | 100 | 0.02 |

TABLE VI

Characterization of Hornification of Grafted Fibers
2. Cell - Na Poly(acrylate-ethylacrylate)

| Grafted Sample Numbers | Product Composition (%) | | | Dry Fiber (Ground on Weber Mill) | | |
|---|---|---|---|---|---|---|
| | Cell. | Ea | Na-Acry. | Physical Form | Estimated Knot Content | Estimated Arith. Av. Fiber Length of Individual Fibers (mm) |
| Wood Pulp | 100 | — | — | Fibrous | 0–10 | 1.3 |
| 1 | 20.7 | 79.3 | 0 | Fibrous | 0–10 | 1.2 |
| 2 | 20.2 | 57.3 | 22.5 | Fibrous | 0–10 | 1.3 |
| 3 | 20.3 | 49.2 | 30.5 | Fibrous | 0–10 | 1.0 |
| 4 | 19.8 | 33.9 | 46.3 | Fibrous | 0–10 | 1.2 |
| 5 | 22.6 | 27.3 | 50.1 | Fibrous | 0–10 | 1.3 |
| 6 | 24.1 | 19.3 | 56.6 | Fibrous | 0–10 | 1.3 |
| 7 | 33.2 | 12.4 | 54.3 | Bonded Fibers | 70 | 1.4 |
| 8 | 34.4 | 0 | 65.6 | Highly Bonded Fibers | 90 | 0.02 |

EXAMPLE VI

The products of Examples I, II and III are tested to determine their ability to maintain their fibrous characteristics after mechanical processing by grinding them into pulp fluff with a Weber hammer mill using a one-fourth-inch screen. The knot content of the resulting fluff is determined according to the constant air-blowing technique wherein a 5 gram sample of the fluff is placed in the bottom of a 1,000 ml. burette and air is admitted through the pet cock at the bottom at a controlled constant flow rate of 3.5 cubic feet per minute to get a tumbling action of the sample, thereby causing the individualized fiber of the sample to escape through the open top end of the burette while leaving the heavier knots or clumps at the bottom. The knots are then removed and weighed and the knot content (as a weight percent of the sample) is determined and reported in Tables V and VI. Additionally, samples of the fibrous fluff are examined and the arithmetic average fiber length determined by microscopy. Fibers are introduced into a microscopic slide and covered with a glass plate. A photo micrograph is taken of this slide at a magnification of 53 times and the length of each fiber photographed is measured. An arithmetic average of these fiber lengths is calculated and these results are reported in Tables V and VI.

Referring now to Tables V and VI, it can be seen that as long as the quantity of non-ionic polymer moiety is maintained within the herein prescribed range, the grafted cellulose copolymer exhibits the same physical properties with respect to fiber length and knot content after mechanical treatment, as does wood pulp. However, as the quantity of non-ionic polymer moiety is decreased in a fiber containing ionic polymer moiety, knot content increases dramatically, making that weight portion of the ground pulp fluff unsuitable for use in a dressing. With respect to fiber length, it can be seen that when the non-ionic polymer moiety is decreased below the herein prescribed limits, the average fiber length has decreased to the point where, in effect, the material may be considered a powder. In this condition, the material cannot be used as a substitution for fibrous wood pulp.

EXAMPLE VII

A dispersion of 5 g of wood pulp in 500 ml of water is prepared in a three-necked flask fitted with a stirrer, a gas bubbling tube, and a stopper-funnel. Dry nitrogen is bubbled through the dispersion for 5 minutes. Twelve and one half milliliters of ceric ammonium nitrate initiator solution as described in Example I is then added along with few drops of Triton X-100 emulsifier while the bubbling of nitrogen and the stirring are continued. To this stirred, nitrogen-flushed dispersion is added a mixture of 23 g of acrylonitrile and 2 g of liquified butadiene. The system is then closed to the atmosphere and the whole is allowed to react at room temperature for 4 hours. At the end of this time, the resulting cellulose graft copolymer fibers are transferred to a Buchner funnel and are washed thoroughly with water and acetone. The washed fibers are refluxed with an excess of 1.5 N sodium hydroxide solution for 30 minutes, washed in water, and then dried in a hot air oven at 60° C. The resulting fibrous hydrolyzed cellulose graft copolymer has a maximum capacity of 13 cc per gram and a retention of 8.4 cc per gram in the uncompressed state. It has a tampon capacity of 5.2 cc per gram when used in a 50% by weight blend with untreated wood pulp in a tampon having a density of 0.4 grams per cc. The fluid used in all these tests is 1% sodium chloride solution.

EXAMPLE VIII

A dispersion of 5 g of cotton (Johnson & Johnson Red Cross Brand) in 500 ml of water in a three-necked flask fitted with a stirrer, a gas bubbling tube, and a stopper funnel is stirred as nitrogen is bubbled through the dispersion for 30 minutes. To this stirred, nitrogen-flushed dispersion is added 12.5 ml of ceric ammonium nitrate initiator solution having a concentration of 1 mole of ceric ammonium nitrate per liter of 1 N nitric acid. After further stirring and nitrogen bubbling for one minute, a mixture of 12.5 ml of acrylonitrile and 12.5 ml of ethyl acrylate is added to the stirred dispersion, and the whole is allowed to react at room temperature for 1 hour. The resulting fibers are washed and hydrolyzed as in Example I. The resulting hydrolyzed cellulose graft copolymer fibers are pressed to remove excess water and dried in an over at 100° C to form a sheet. The sheet is ground into a fluff form which exhibits excellent fibrous characteristics and absorbency.

EXAMPLE IX

Samples are prepared consisting of 2 gram pads of compressed and uncompressed grafted cellulose copolymer fibers corresponding in composition to samples 2–8 of Table III and 2–7 of Table IV. Additionally, further pads are prepared using fibers made in accordance with the method of Examples I, II and III and corresponding in all respect to the samples enumerated above with the exception that these further samples were not hydrolyzed and so had the composition shown in Table III and IV for samples 2–8 and 2–7, respectively, under the heading, Unhydrolyzed Product. Similarly, hydrolyzed and unhydrolyzed samples of the cellulose acrylonitrile butadiene graft copolymers of Example VII are made. The hydrolyzed and unhydrolyzed sample pads are subjected to a flame test wherein each sample is gripped in a pair of tongs and held in the hot-test portion of the flame from a Bunsen burner for ten seconds. The sample is then removed. Samples which, after removal, exhibited a subsisting flame or glow are characterized as flammable and the remaining samples are characterized as non-flammable. The results of this test shows in each instance, that the unhydrolyzed fibers are highly flammable whereas the hydrolyzed fibers are non-flammable.

What is claimed is:

1. In an absorbent dressing for absorbing body fluids the improvement which comprises including therein as an absorbent media, cellulose graft copolymer in fibrous form having a backbone of cellulose and side chains of polymer moieties grafted thereto, said polymer moieties being selected from the class consisting of ionic and nonionic polymer moieties and constituting from about 10% to about 90% by weight of the total weight of the cellulose graft copolymer, some of said side chain polymer moieties being ionic polymer moieties and comprising from about 10% to about 80% by weight of the total weight of the cellulose graft copolymer, and the other of said side chain polymer moieties being nonionic polymer moieties and comprising from about 0.5% to about 60% by weight of the total weight of the cellulose graft copolymer.

2. The absorbent dressing of claim 1 wherein said polymer moieties constitute from about 60% to about 80% by weight of the total weight of the cellulose graft copolymer, said ionic polymer moieties comprising from about 20% to about 70% by weight of the total weight of the cellulose graft copolymer, and said nonionic polymer moieties comprise from about 1% to about 60% by weight of the total weight of the cellulose graft copolymer.

3. The absorbent dressing of claim 1 wherein said dressing comprises said cellulose grafted copolymer and untreated cellulose fibers.

4. The absorbent dressing of claim 1 wherein said absorbent dressing is a sanitary napkin.

5. The absorbent dressing of claim 1 wherein said absorbent dressing is a diaper.

6. The absorbent dressing of claim 1 wherein said absorbent dressing is a tampon.

7. In an absorbent dressing for absorbing body fluids the improvement which comprises including therein as an absorbent media cellulose grafted copolymer in fibrous form, said graft copolymer having a backbone of cellulose and side chains of polymer moieties grafted thereto, said polymer moieties being selected from the class consisting of ionic and nonionic polymer moieties and constituting from about 10% to about 90% by weight of the total weight of the cellulose graft copolymer, some of said side chain polymer moieties being ionic polymer moieties and comprising from about 10% to about 80% by weight of the total weight of the cellulose graft copolymer, and the other of said side chain polymer moieties being nonionic polymer moieties and comprising from about 0.5% to about 60% by weight of the total weight of the cellulose graft copolymer, said ionic polymer moieties selected from the group consisting of poly(acrylic acid), sodium poly(acrylate), poly(methacrylic acid), potassium poly(methacrylate), poly(vinyl alcohol sulfate), poly(phosphoric acid), poly(vinyl amine), poly(4-vinyl pyridine), and hydrolyzed poly(acrylonitrile), and said nonionic polymer moieties selected from the group consisting of poly(methyl methacrylate), poly(ethyl methacrylate), poly(ethyl acrylate), poly(butyl acrylate), poly(vinyl acetate), poly(styrene), poly(butadiene), and poly(isoprene).

8. The absorbent dressing of claim 7 wherein said polymer moieties constitute from about 60% to about 80% by weight of the total weight of the cellulose graft copolymer, said ionic polymer moieties comprising from about 20% to about 70% by weight of the total weight of the cellulose graft copolymer, and said nonionic polymer moieties comprise from about 1% to about 60% by weight of the total weight of the cellulose graft copolymer.

9. The absorbent dressing of claim 7 wherein said dressing comprises said cellulose grafted copolymer and untreated cellulose fibers.

10. The absorbent dressing of claim 7 wherein said absorbent dressing is a sanitary napkin.

11. The absorbent dressing of claim 7 wherein said absorbent dressing is a diaper.

12. The absorbent dressing of claim 7 wherein said absorbent dressing is a tampon.

* * * * *